(12) United States Patent
Nakayama

(10) Patent No.: US 7,210,751 B2
(45) Date of Patent: May 1, 2007

(54) MOUNTING/DEMOUNTING CONSTRUCTION OF APPARATUS UNIT, AND ELECTRONIC APPARATUS

(75) Inventor: Takaya Nakayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 304 days.

(21) Appl. No.: 10/920,331

(22) Filed: Aug. 18, 2004

(65) Prior Publication Data

US 2005/0236944 A1    Oct. 27, 2005

(30) Foreign Application Priority Data

Apr. 27, 2004   (JP) .............................. 2004-131501

(51) Int. Cl.
*A47B 88/00*    (2006.01)
(52) U.S. Cl. ................. 312/332.1; 312/223.1; 361/727
(58) Field of Classification Search .......... 312/223.2, 312/216, 244, 333, 332.1; 361/724, 725, 361/726, 727; 439/299, 300, 483, 511; 174/54, 174/59, 60
See application file for complete search history.

(56) References Cited

U.S. PATENT DOCUMENTS

| | | | | |
|---|---|---|---|---|
| 791,112 A * | 5/1905 | Rothwell | .................... | 312/286 |
| 2,514,246 A * | 7/1950 | Knox | .......................... | 361/727 |
| 4,586,766 A * | 5/1986 | Hofmeister | .................. | 439/160 |
| 5,641,296 A * | 6/1997 | Larabell et al. | ............. | 439/342 |
| 5,949,652 A * | 9/1999 | McAnally et al. | .......... | 361/726 |
| 6,549,424 B1 * | 4/2003 | Beseth et al. | ............... | 361/801 |
| 6,652,298 B2 * | 11/2003 | Ohnuki | ....................... | 439/157 |

FOREIGN PATENT DOCUMENTS

| | | |
|---|---|---|
| JP | 2001-27847 | 1/2001 |
| JP | 2001-206562 | 7/2001 |

* cited by examiner

*Primary Examiner*—Janet M. Wilkens
(74) *Attorney, Agent, or Firm*—Westerman, Hattori, Daniels & Adrian, LLP.

(57) ABSTRACT

A mounting/demounting construction relates to a mounting/demounting construction of a heavy unit and so on, and can heighten safety of mounting and demounting thereof. The mounting/demounting construction has a mountable/demountable apparatus unit which is slidably supported in a shelf, and a locking mechanism, providing a lock arm part engaging with the shelf to the apparatus unit, which engages the lock arm part with the shelf and regulates the apparatus unit in a predetermined drawing-out range, and prevents a separation of the apparatus unit from the shelf. By a composition like this, a locking state by the locking mechanism can be released by an operation of the lock arm part different from a drawing-out operation of the apparatus unit.

15 Claims, 16 Drawing Sheets

F I G. 13
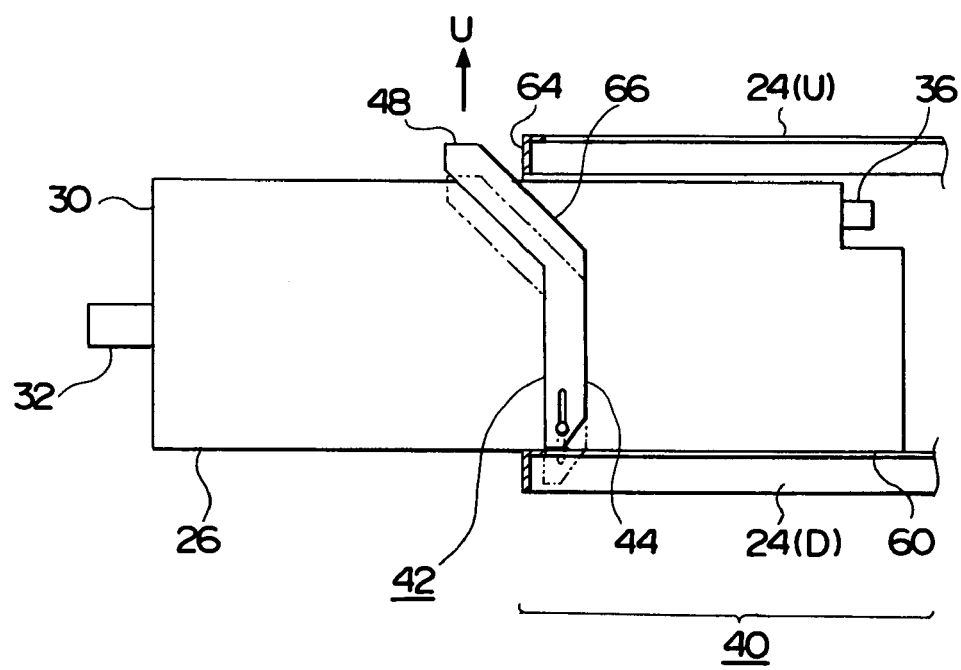

F I G . 15
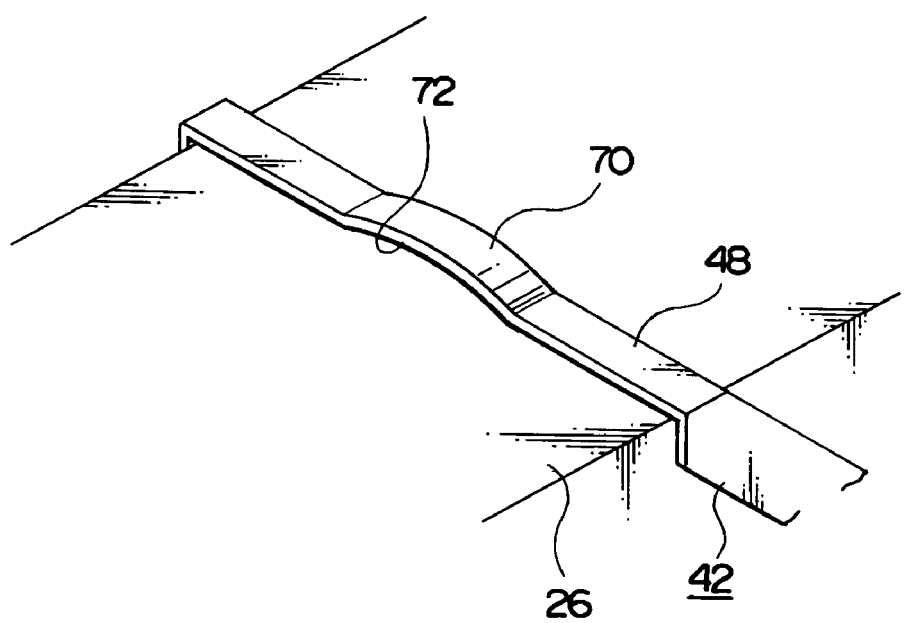

MOUNTING/DEMOUNTING CONSTRUCTION OF APPARATUS UNIT, AND ELECTRONIC APPARATUS

BACKGROUND OF THE INVENTION

1. Field of the Invention

The present invention relates to a mounting/demounting construction used for the mounting and demounting of a heavy unit and so on which are installed in an electronic apparatus such as a disk array apparatus.

2. Description of the Related Art

In an electronic apparatus providing a heavy unit of a battery unit and so on, for example, as shown in FIG. 1 and FIG. 2, a battery unit 6 is installed to be mountable and demountable in a shelf 4 of an apparatus casing 2 by sliding. Further, in the battery unit 6, a grip 10 is attached to its front panel part 8, and a marker line 12 representative of a drawing-out limit of the battery unit 6 is also given to its upper face part.

When drawing out the above-mentioned battery unit 6 from the apparatus casing 2, an operator holds the grip 10 and draws out the battery unit 6 until a portion of the marker line 12 appears, and lends a hand to a lower part of the battery unit 6. That is, it is necessary to operate the battery unit 6 by both hands. Further, even in case of the installation of a battery unit 6 which is exchanged, the operator grasps the grip 10 by one hand and supports the battery unit 6 by the other hand, and the battery unit 6 is set up. Such an exchange operation is a troublesome operation in case in which the battery unit 6 reaches several tens of kilograms in weight, and a burden to an operator is to increase according as the number of times of exchange operations increases.

As earlier patent documents in relation to such a mounting/demounting construction of a heavy unit, the Japanese Patent Laid Open Publications No. 2001-27847, No. 2001-206562 and so on are in existence.

The Publication No. 2001-27847 discloses a developing device realizing a mechanism, which can easily release the developing device from a locking state with a simple operation in case of taking out the developing device from the main body of an image forming device, by a simple construction. Its constitution has a carrying knob for a developing unit, and a second engagement part which is provided to the knob. When the developing unit is shifted to a drawing-out operation, this knob can be retreated in a direction, which allows to draw out the developing, unit from the image forming device, from an engaging state with a first engagement part.

Further, the Publication No. 2001-206562 discloses a construction in which an operation to take out a carrier unit such as a large and heavy fixing unit from an apparatus is smoothly and certainly performed. Its constitution has a rail and a drawing stopper. The rail guides a fixing unit at the time of drawing out the fixing unit toward an opening of a side face of an apparatus main body. The drawing stopper acts on a projection provided at a lower portion of the fixing unit in the vicinity of the opening, regulates movement of the fixing unit in a drawing-out direction, and serves as a revolving fulcrum in a releasing direction of the fixing unit.

By the way, even if a quantity of a unit drawing-out limit is aroused by giving a maker line to a unit, there is a danger such as a fall of a unit. That is, if an operator lacks recognition of the marker line or makes an error in a drawing-out operation, or if the unit is drawn out disregarding the maker line, since a heavy unit can not be supported by one hand holding the knob, the danger of a fall and so on may be invited. If the fall occurs, there is a fear of damage of the unit, and so on.

Furthermore, the Publication No. 2001-27847 or No. 2001-206562 discloses a construction which limits the drawing-out of a unit. However, both of them are complicated, and there is room for improvement in the convenience for use. In addition, since in these patent documents an operation by means of one hand can be performed after the restriction of drawing-out is released, there is a problem in safety in case of applying to a heavy unit.

SUMMARY OF THE INVENTION

The present invention relates to a mounting/demounting construction of an apparatus unit, and an object of the present invention is to heighten safety of the mounting and demounting of an apparatus unit.

Another object of the present invention is to realize a mounting/demounting construction in which an operation and management of a unit by means of both hands are compelled at the time of the mounting and demounting of an apparatus unit.

In order to attain the above objects, a mounting/demounting construction of an apparatus unit according to the present invention is a composition which has an mountable/demountable apparatus unit that is slidably supported in a shelf, and a locking mechanism, providing a lock arm part engaging with the shelf to the apparatus unit, that engages the lock arm part with the shelf and regulates the apparatus unit in a predetermined drawing-out range, and prevents a separation of the apparatus unit from the shelf.

According to a composition like this, a drawing-out range of the apparatus unit is restricted by the engagement between the shelf and the lock arm part, and the separation from the shelf is prevented. Hence, safety in an exchange operation thereof and so on can be heightened.

In order to attain the above objects, the above-mentioned lock arm part may also be constructed so that the lock arm part is hidden in the shelf by the apparatus unit being housed. According to a composition like this, since the lock arm part is hidden in the shelf together with the apparatus unit, along with protection of the lock arm part, it is prevented that an engaged relation between the lock arm part and the shelf is damaged.

In order to attain the above objects, the above-mentioned lock arm part may also be constructed so that the lock arm part is exposed from the shelf by drawing-out of a predetermined quantity of the apparatus unit from the shelf and can be released from engagement with the shelf. According to a composition like this, the lock arm part is exposed from the shelf with the drawing-out of the apparatus unit, and it is possible to release the engagement between the lock arm part and the shelf.

In order to attain the above objects, the above-mentioned lock arm part may also be constructed so that the lock arm part has a grip part which is exposed from the shelf when the apparatus unit is drawn out from the shelf. That is, it is possible to operate the lock arm part by the grip part.

In order to attain the above objects, the above-mentioned mounting/demounting construction may also be constructed so that a lock groove is provided to a shelf part of the shelf and a hooking part inserted into the lock groove is provided to the lock arm part, and so that drawing-out of the apparatus unit is restricted to a range of the lock groove by engagement between the lock groove and the hooking part.

In order to attain the above objects, the above-mentioned mounting/demounting construction may also be constructed so that a first taper part is provided to the lock arm part, and so that the lock arm part receives a force applied to the apparatus unit through contact between the first taper part and a shelf part of the shelf and is pulled up. According to a composition like this, since the lock arm part is operated by a force given to the apparatus unit, it is possible to make the lock arm part shift to a locking state with a simple operation.

In order to attain the above objects, the above-mentioned mounting/demounting construction may also be constructed so that a second taper part is provided to the lock arm part, and so that the lock arm part receives a force applied to the apparatus unit through contact between the second taper part and a shelf part of the shelf and is pulled down. According to a composition like this, when the apparatus unit is put up by the lock arm part, the lock arm part is forcedly pulled down by receiving a force in a housing direction applied to the apparatus unit, and it is possible to make a state, in which the lock arm part is pulled up, shift to a housing state with a simple operation.

Further, in order to attain the above objects, the above-mentioned mounting/demounting construction may also be constructed so that the above-mentioned apparatus unit is a case unit of an electronic apparatus, a power supply unit or a battery unit.

Furthermore, in order to attain the above objects, an electronic apparatus according to the present invention is a composition that has the above-mentioned mounting/demounting construction of an apparatus unit. According to a composition like this, in an electronic apparatus, the facility and safety of the mounting and demounting of an apparatus unit can be obtained.

The present invention can facilitate an exchange operation of various apparatus units, such as a battery unit, which are installed by using a shelf. Along with this, the present invention can heighten the safety of an operator, and can also protect an apparatus unit and/or an electronic apparatus from damage. Hence, the present invention is useful.

According to the mounting/demounting construction of an apparatus unit of the present invention, it is possible to facilitate the mounting and demounting of an apparatus unit to a shelf, and it is also possible to heighten safety.

In addition, according to the electronic apparatus of the present invention, since the electronic apparatus has the mounting/demounting construction of an apparatus unit, it is possible to facilitate the mounting and demounting of an apparatus unit, and it is also possible to heighten safety

BRIEF DESCRIPTION OF THE DRAWINGS

The foregoing and other objects, features and attendant advantages of the present invention will be appreciated as the same become better understood by means of the following description and accompanying drawings wherein:

FIG. 13 is a side view showing an exchange operation of the battery unit;

FIG. 15 is a perspective view showing a modified example of a grip part of a lock arm part.

DETAILED DESCRIPTION OF THE PREFERRED EMBODIMENTS

Figure 1:
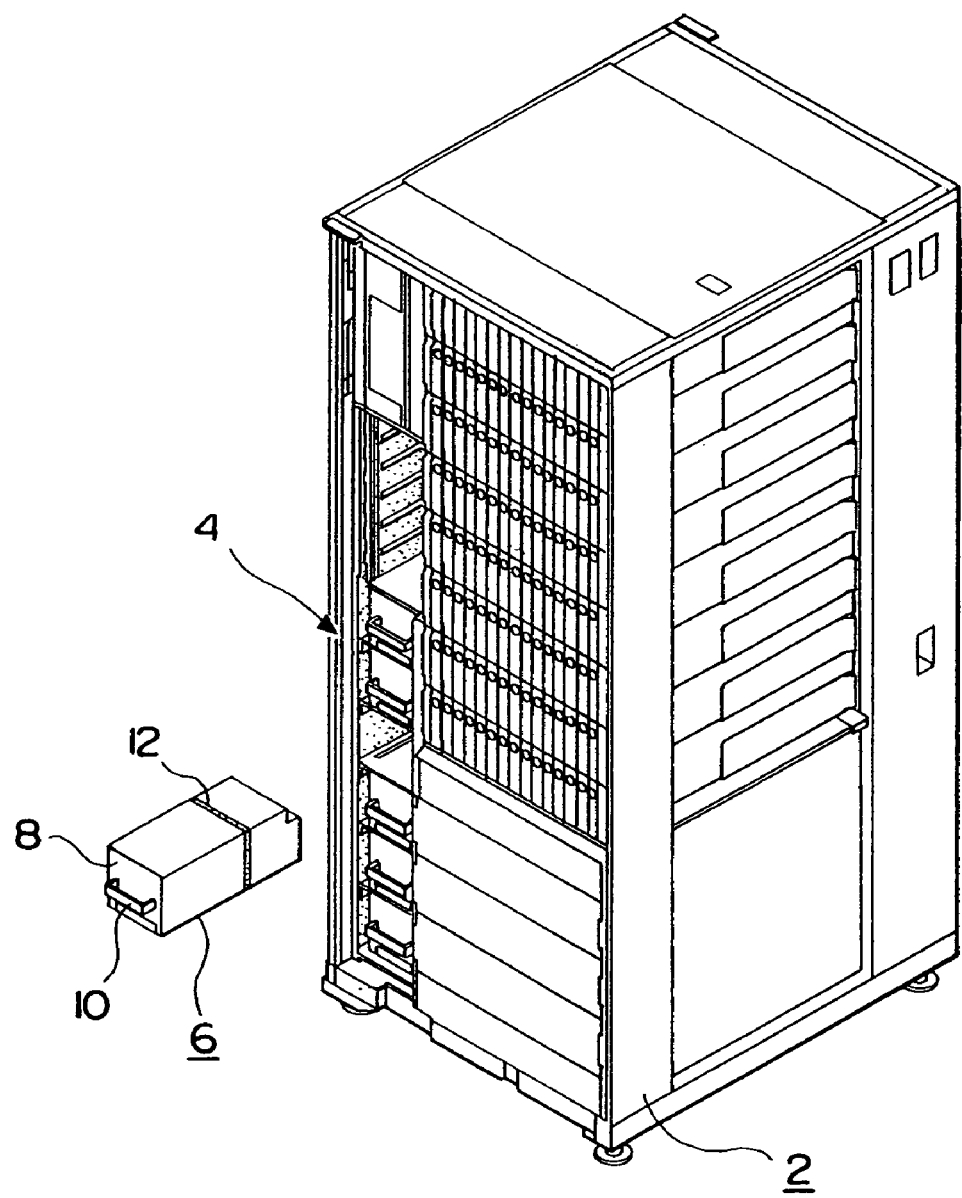
FIG. 1 is a perspective view showing an electronic apparatus providing a battery unit.
Figure 2:
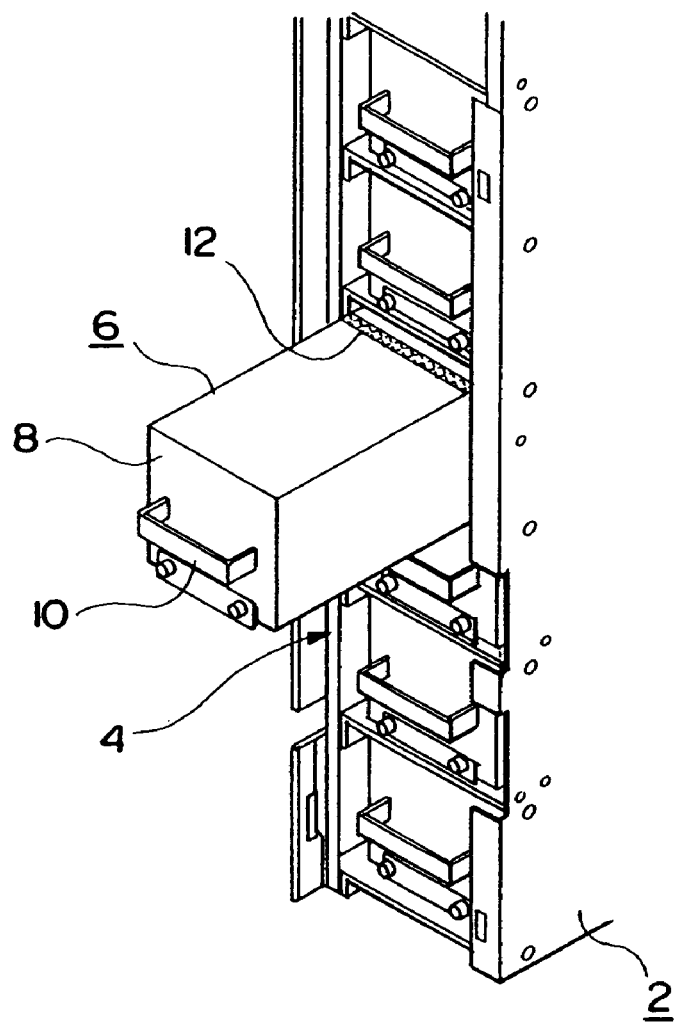
FIG. 2 is a perspective view showing a shelf construction of an electronic apparatus.
Figure 3:
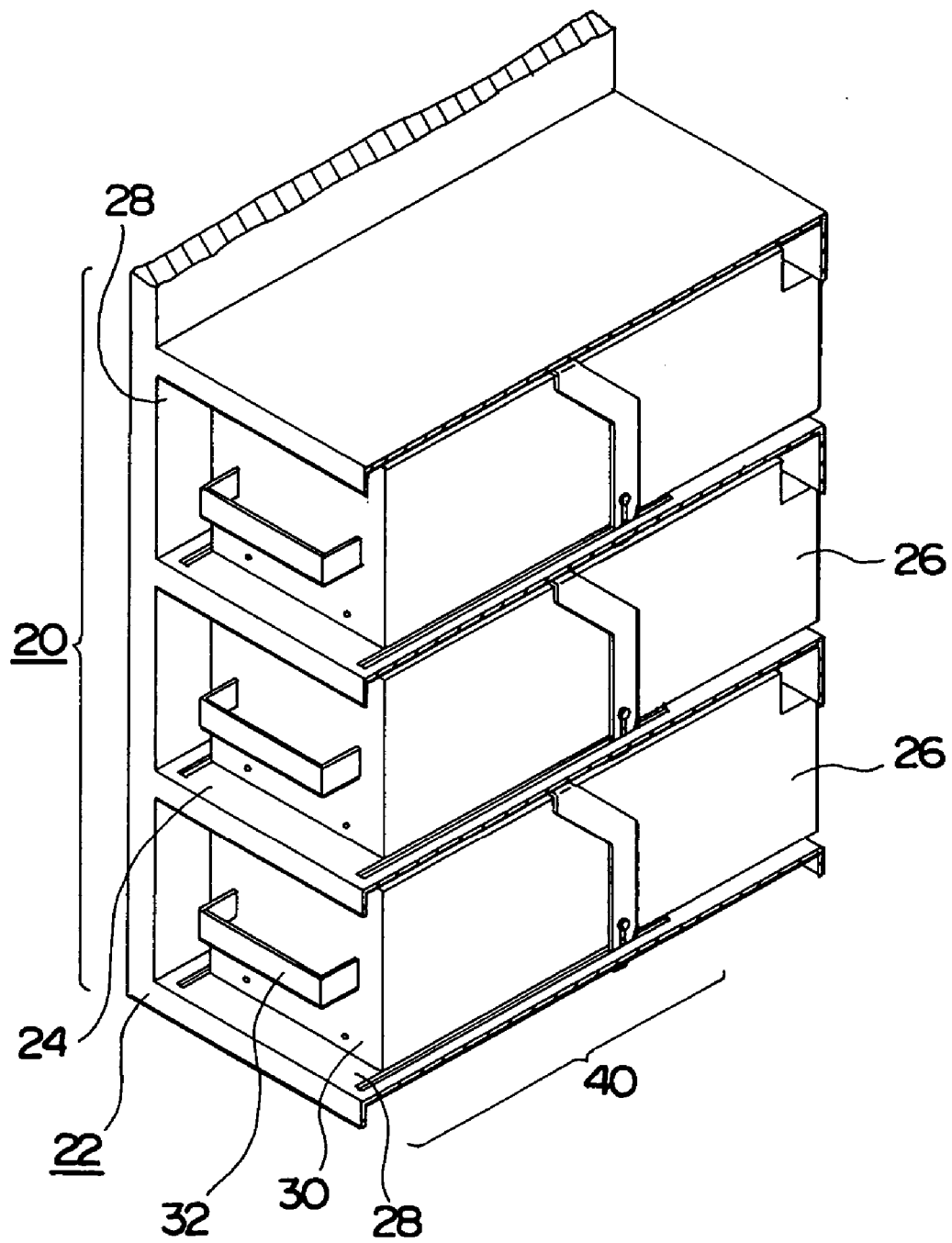
FIG. 3 is a perspective view showing an embodiment of a mounting/demounting construction of an apparatus unit, and an electronic apparatus according to the present invention.
Figure 4:
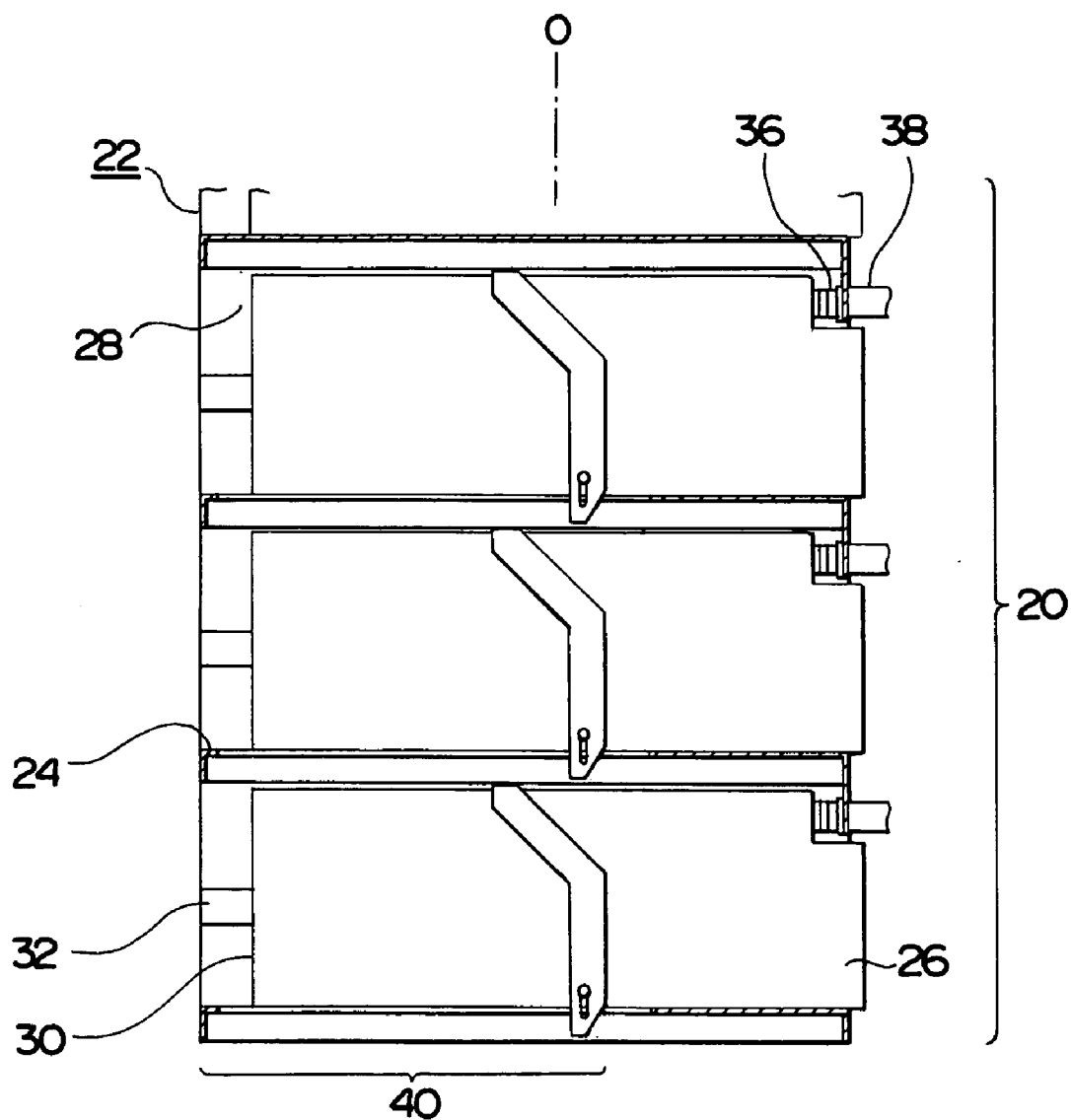
FIG. 4 is a side view showing a mounting/demounting construction of an apparatus unit, and an electronic apparatus.

In connection with a mounting/demounting construction of an apparatus unit according to the present invention and an electronic apparatus of the present invention having this mounting/demounting construction of an apparatus unit, an explanation is given by referring to FIG. 3 and FIG. 4. FIG. 3 is a perspective view showing an outline of the electronic apparatus providing the mounting/demounting construction of an apparatus unit, and FIG. 4 is a side view thereof.

The electronic apparatus 20, for example, is a disk array apparatus, and has a shelf 22 as an apparatus casing part. Shelf rails 24 of a plurality of tiers are provided in this shelf 22 as a shelf part, that is the shelf rail 24 is exemplification of a shelf part. As a plurality of mountable/demountable apparatus units which are slidably supported on each shelf rail 24, for example, a plurality of battery units 26 is installed. An outside part of the shelf 22, the shelf rail 24 and the battery unit 26 may be done with either synthetic resin or metal.

Figure 5:
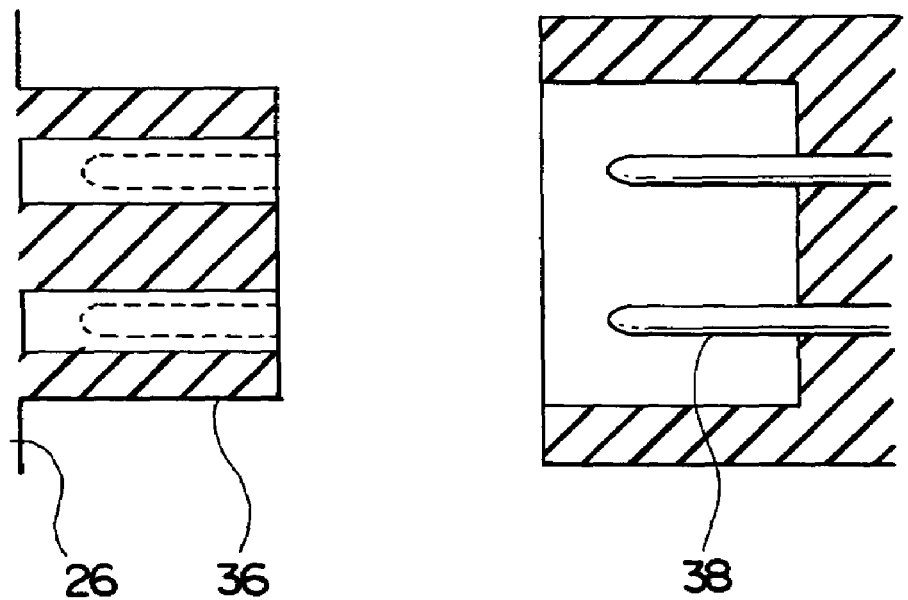
FIG. 5 is a sectional view showing a connecting construction of a connector part.

An outside shape of the battery unit 26, for example, is a rectangular parallelepiped shape, and a space part 28 having a shape necessary for a store of the battery unit 26 is set to an upper face part of the shelf rail 24. To a front panel part 30 of the battery unit 26 housed in this space part 28, a U-shaped grip part 32 is attached. This grip part 32 is used for an operation of mounting and demounting of the battery unit 26 to the shelf 22, and so on. Although the grip part 32 is protruded from the front panel part 30 of the battery unit 26, the battery unit 26 is housed in the shelf 22 so that the grip part 32 does not project from a front face side of the shelf 22. Further, for example, as shown in FIG. 5, a connector part 36 is provided at a rear face part of the battery unit 26, and a connector part 38 corresponding to the connector part 36 is provided at a side of the shelf 22. If the battery unit 26 is housed in a predetermined position of the shelf 22, the connector part 36 is connected to the connector part 38 of the shelf 22 side, and a predetermined electrical coupling is obtained. In this case, since an electrical feed is given to a function part of the electronic apparatus 20 from the battery unit 26, whether or not the battery unit 26 is mounted on the predetermined position is decided by the function part side of the electronic apparatus 20 from a state of that electrical feed, and a result of that decision is shown by an indicator and so on not shown in the drawings. On the other hand, in case in which the battery unit 26 is separated, it is possible to recognize a separation of the battery unit 26 from the shelf 22 by an indication of the indicator and so on.

In addition, the shelf 22 has a looking mechanism 40 which regulates a drawing-out range of the battery unit 26 by means of maintenance of a locking state and can release the locking state by a predetermined operation. This locking mechanism 40 restricts the battery unit 26 within a predetermined drawing-out range. Along with this, for example, the locking mechanism 40 makes it possible to take out the battery unit 26 from the shelf 22 in case in which the battery unit 26 drawn out is managed by both hands of an operator.

In a composition like this, the locking mechanism 40 is hidden in the shelf 22 together with the battery unit 26, and can be operated at the time of drawing out the battery unit 26 from the shelf 22. For example, at the time of mounting and demounting the battery unit 26 as a heavy unit, an operator is compelled to manage the battery unit 26 by both hands. Because of this, an exchange operation and so on can be performed with high safety.

Figure 6:
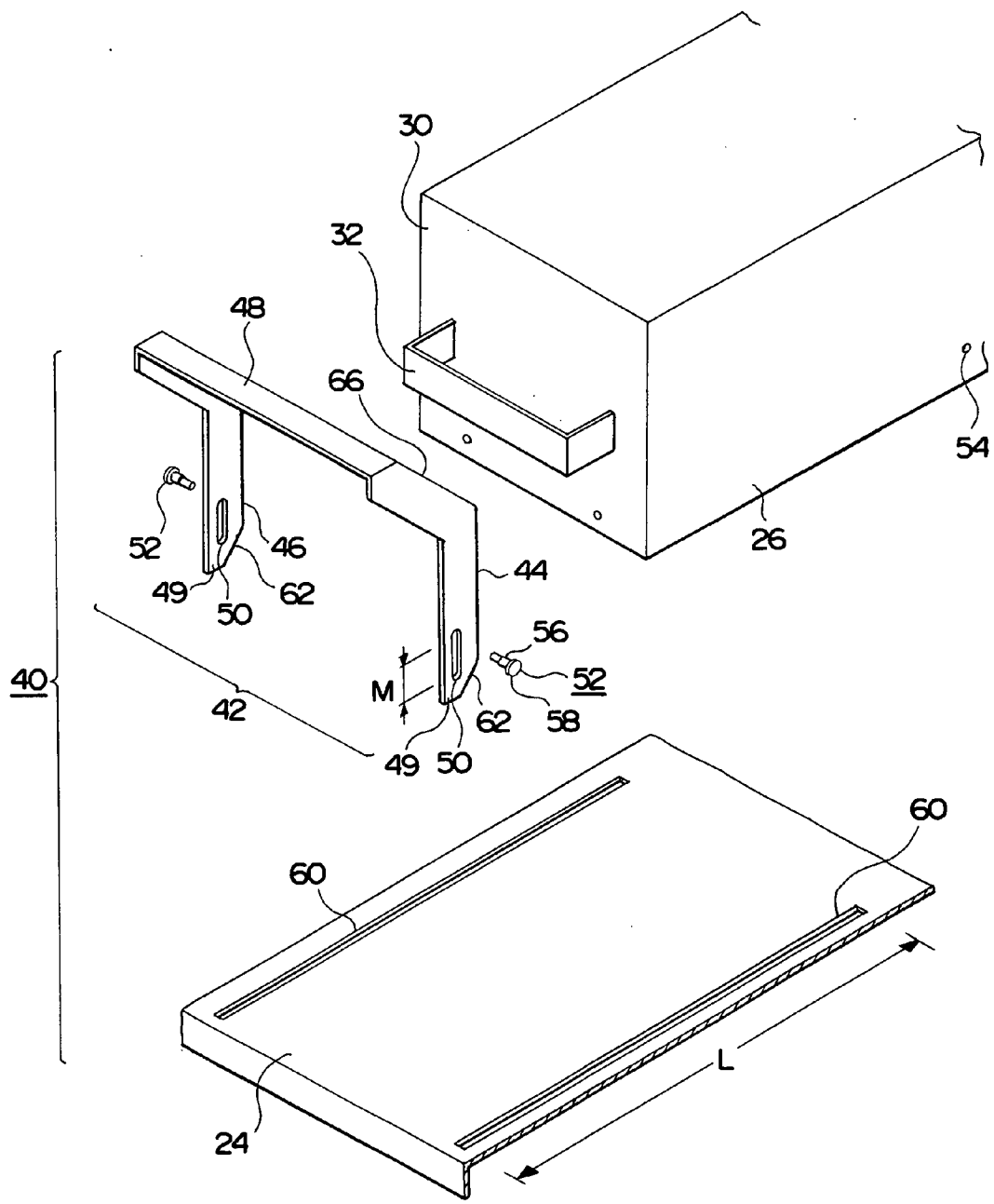
FIG. 6 is an exploded perspective view showing an example of a mounting/demounting construction of an apparatus unit.
Figure 7:
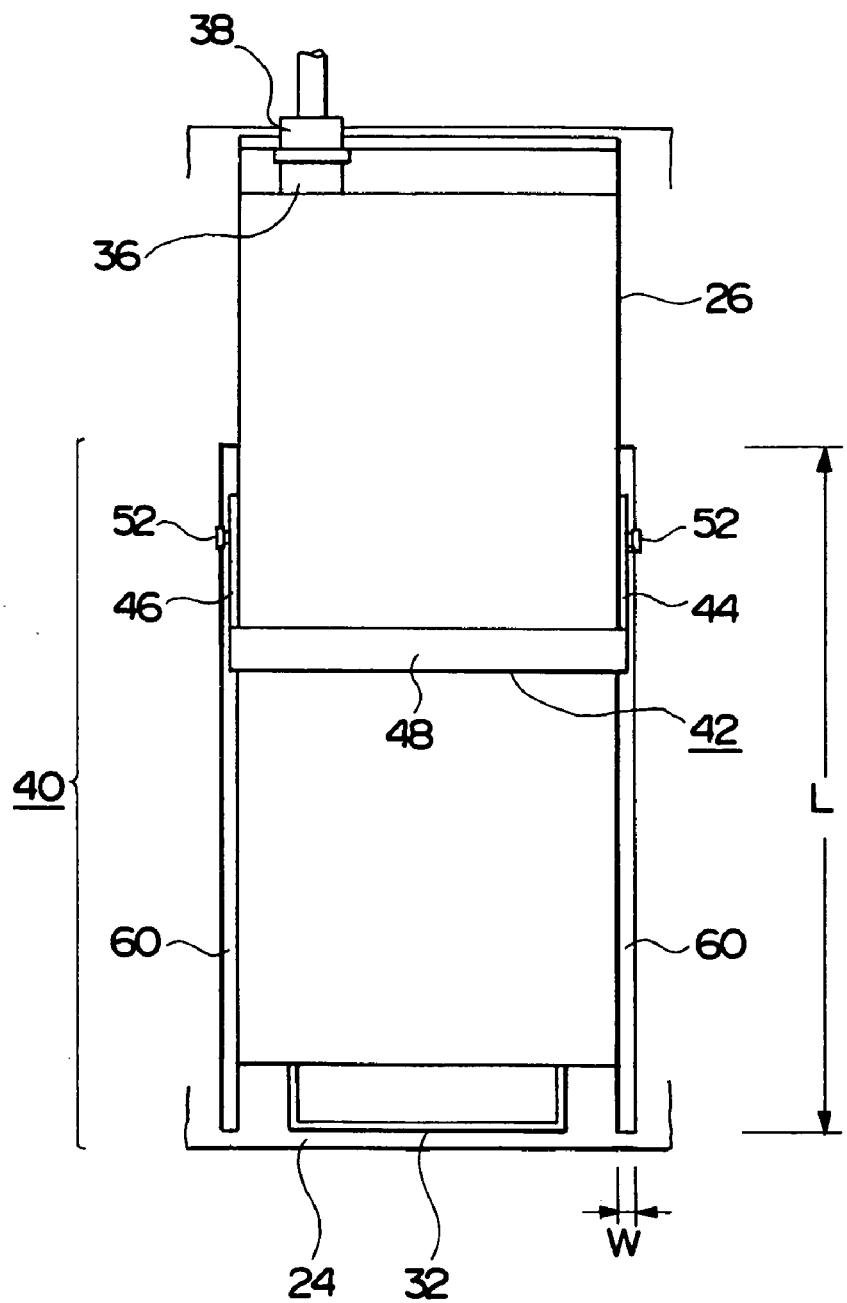
FIG. 7 is a plan view showing a shelf part and a battery unit.
Figure 8:
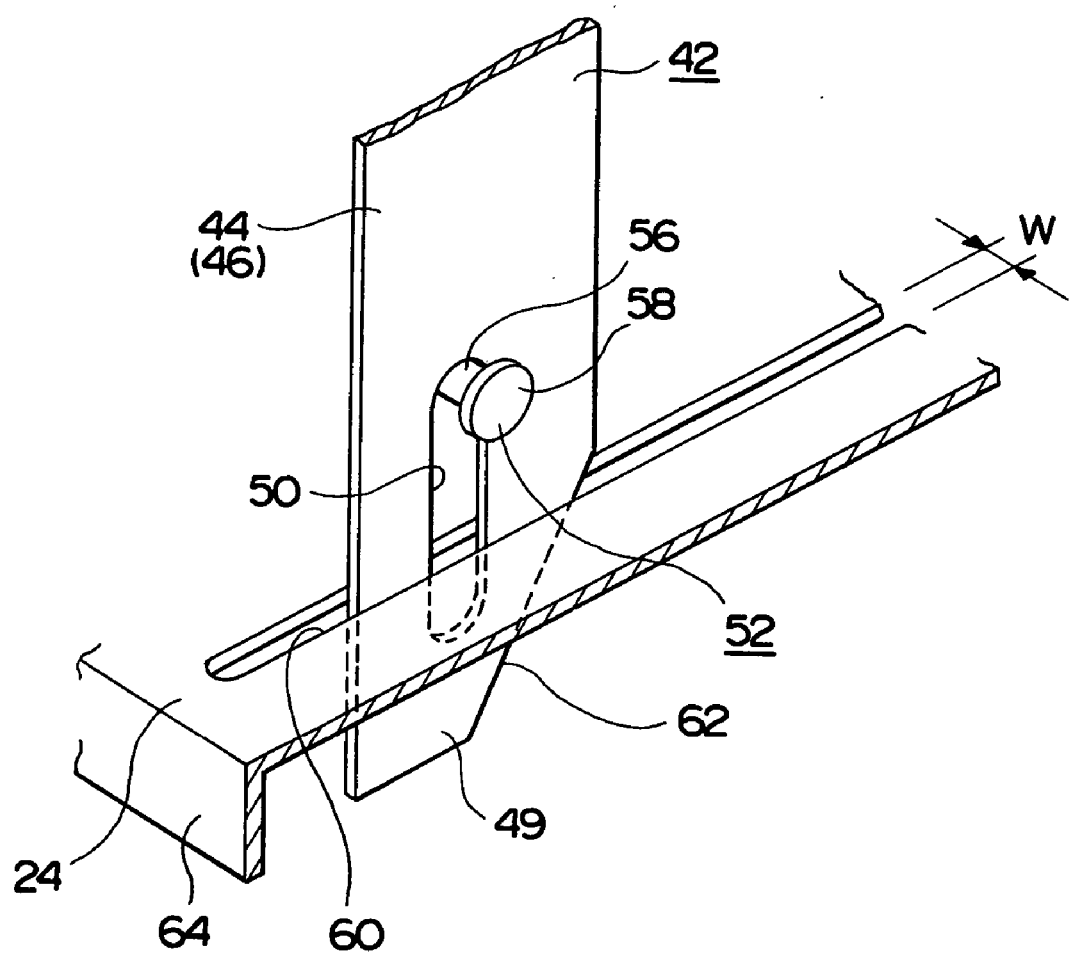
FIG. 8 is a perspective view showing engagement between a shelf part and a lock arm part.

Next, this locking mechanism 40 is explained by referring to FIG. 6, FIG. 7 and FIG. 8. FIG. 6 is an exploded perspective view showing a locking mechanism part, FIG. 7 is a plan view thereof, and FIG. 8 is a perspective view showing an engagement part between a lock arm part and a shelf part.

For example, this locking mechanism 40 has a C-shaped lock arm part 42 corresponding to a vertical sectional shape of the battery unit 26. This lock arm part 42 is an operation part which is used for a release of a locking state of the locking mechanism 40 and is also used for the mounting/demounting of the pulling-up and so on of the battery unit 26. The lock arm part 42 is formed by a rigid material such as a metal, and has boomerang-shaped side arms 44 and 46 on both sides. A portion between the side arms 44 and 46 is connected by a grip part 48. Supposing that the battery unit 26 is pulled up with the grip part 48, the side arms 44 and 46 are arranged so as to cross a center o (FIG. 4) in a longitudinal direction of the battery unit 26. The side arms 44 and 46 may also be arranged across a position of the center of gravity of the battery unit 26.

Further, to each of the side arms 44 and 46, a hooking part 49 is provided at its pointed end side, and a slot 50 is also provided at its intermediate portion. As a member to slidably attach the side arms 44 and 46, a pair of supporting pins 52 is provided. By each of the supporting pins 52 being made to pass through the slot 50, the supporting pins 52 are fixed to fitting holes 54 formed at both side face parts of the battery unit 26, respectively. A fixation of the supporting pins 52 to the battery unit 26 may also be done by any of a screw, welding, press fitting and so on. Furthermore, each of the supporting pins 52 has an axis part 56 thinner than width of the slot 50 and a head part 58 larger in diameter than width of the slot 50. Therefore, the lock arm part 42 can move up and down within width of length M of the slot 50 through which the supporting pin 52 passes, and can also be made to go down by its self-weight.

Moreover, length of the side arms 44 and 46 is formed longer than height of a side face of the battery unit 26. In a down state of the side arms 44 and 46, as shown in FIG. 8, the hooking parts 49 are inserted into a pair of lock grooves 60 formed on the shelf rail 24, respectively. Width W of each lock groove 60 (FIG. 7, FIG. 8) is set to a value larger than thickness of the side arms 44 and 46, and the side arms 44 and 46 can move freely. Length L of the lock grooves 60 (FIG. 6, FIG. 7) gives a moving limit of the side arms 44 and 46. This length L is a range in which the battery unit 26 can be drawn out from the shelf 22 by the grip part 32. That is, the engagement between each of the side arms 44 and 46 and each of the grooves 60 forms a locking state which restricts a slidable range of the battery unit 26 to a certain range.

Figure 9A:
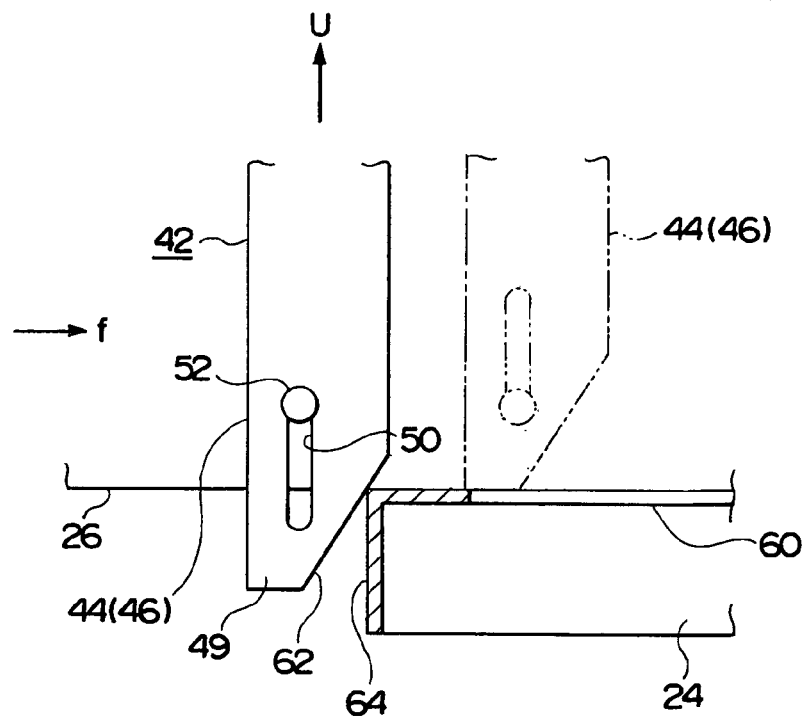
FIG. 9A and FIG. 9B are drawings showing the pulling-up of a lock arm part.
Figure 9B:
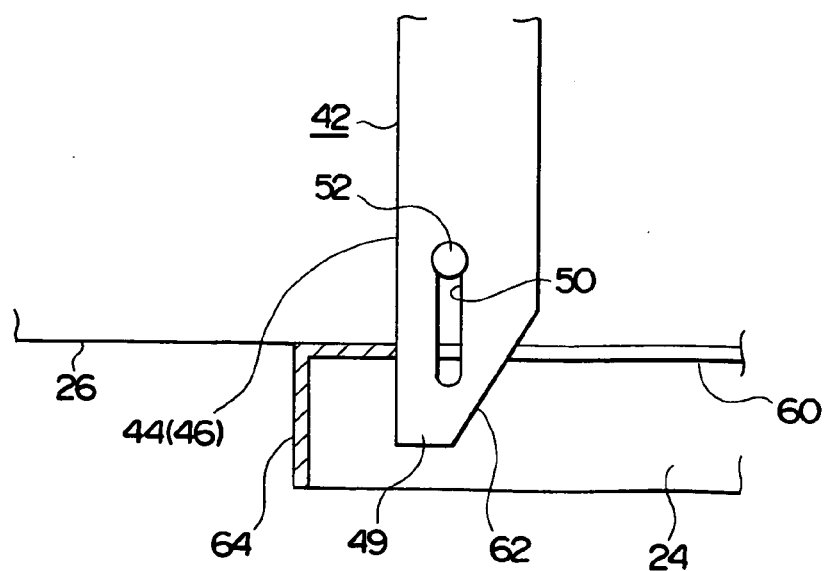
Figure 10A:
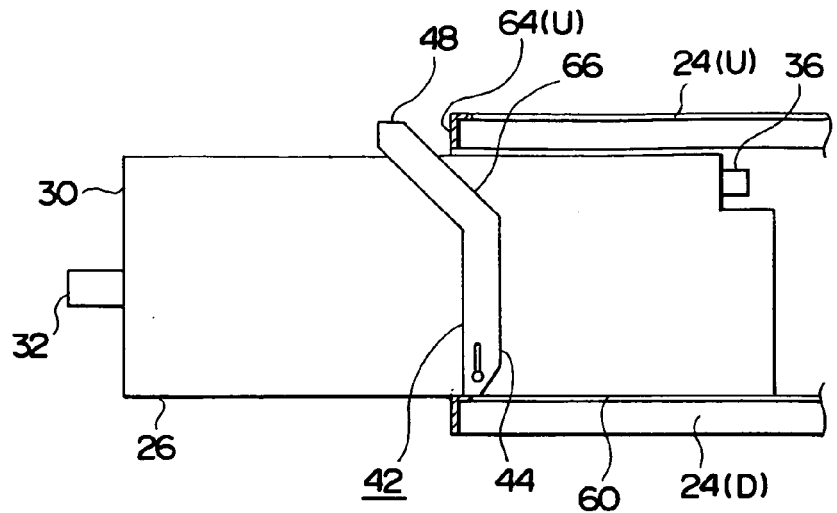
FIG. 10A and FIG. 10B are drawings showing the pulling-down of a lock arm part.
Figure 10B:
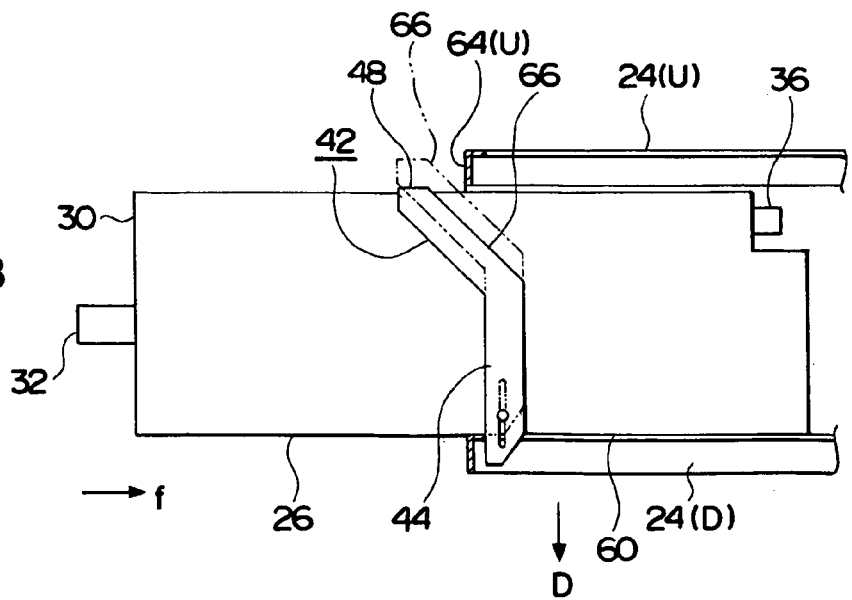

Next, a relation between the lock arm part and the shelf part is explained by referring to FIG. 9 and FIG. 10. FIG. 9A and FIG. 9B are drawings showing a pulling-up operation by means of the side arms, and FIG. 10A and FIG. 10B are drawings showing a pulling-down operation of the side arms.

As shown in FIG. 9A, at a rear portion of the hooking part 49 of the side arm 44 (46) a first taper part 62 is formed, and this taper part 62 comes into contact with a front edge portion 64 of the shelf rail 24. Under a state that the contact between the taper part 62 and the front edge portion 64 of the shelf rail 24 is given, if a force f in a mounting direction is applied to the battery unit 26, a slip occurs between the taper part 62 and the front edge portion 64 of the shelf rail 24 by receiving that force f. By this, a force in a pulling-up direction (an arrow U) is applied to the side arm 44 (46), and the lock arm part 42 is pulled up in an upper direction and is put on the shelf rail 24. That is, a pulling-up mechanism of the lock arm part 42 is constituted by the taper part 62, the front edge portion 64 of the shelf rail 24, and so on.

Under a state that the side arm 44 (46) of the lock arm part 42 is put on the shelf rail 24 as shown by a two-dot chain line in FIG. 9A, if the battery unit 26 is pushed into the shelf 22, as shown in FIG. 9B, the hooking part 49 moves to a side of the lock groove 60 and then moves with a fallen state in the lock groove 60 by means of the self-weight of the lock arm part 42. This movement is regulated by an engaging relation between the supporting pin 52 and the slot 50.

Further, as shown in FIG. 10A, the side arm 44 (46) is a bending shape like a boomerang, and a second taper part 66 is formed in the rearward of the grip part 48. It is possible for this taper part 66 to contact with a front edge portion 64(U) of a shelf rail 24(U) of an upper side. In case in which a state that the lock arm part 42 is pulled up is maintained, as shown in FIG. 10B as an example, if the battery unit 26 is put on a shelf rail 24 (D) and is made to slide, the taper part 66 of the lock arm part 42, which is at an upper potion of the lock arm part 42, hits on the front edge portion 64 (U) of the shelf rail 24 (U) of the upper side as shown by a two-dot chain line. Then, by receiving a force f in a direction shown by an arrow applied to the battery unit 26, the same force f is applied to the taper part 66 of the side arm 44 (46) from the front edge portion 64 (U) of the shelf rail 24 (U), and the lock arm part 42 is to go down. That is, a pulling-down mechanism of the lock arm part 42 is constituted by the taper part 66, the front edge portion 64 of the shelf rail 24, and so on. Since the lock arm part 42 is a composition able to fall by its self-weight, in case in which there is an obstacle in a fall operation for some reason or other (for example, when the lock arm part 42 does not go down by itself), the lock arm part 42 is linked with a mounting operation of the battery unit 26 and is automatically and forcibly pulled down as shown by an arrow D. By this, the lock arm part 42 is housed in the space part 28 of the shelf 22 together with the battery unit 26. According to a composition like this, by being operated in a direction different from a sliding direction by means of the grip part 32 of the battery unit 26, namely, by being operated in an orthogonal direction, the locking mechanism 40 is shifted to the locking state, and this locking state is released.

In a composition like this, an exchange operation of the battery unit 26 is explained.

Figure 11:
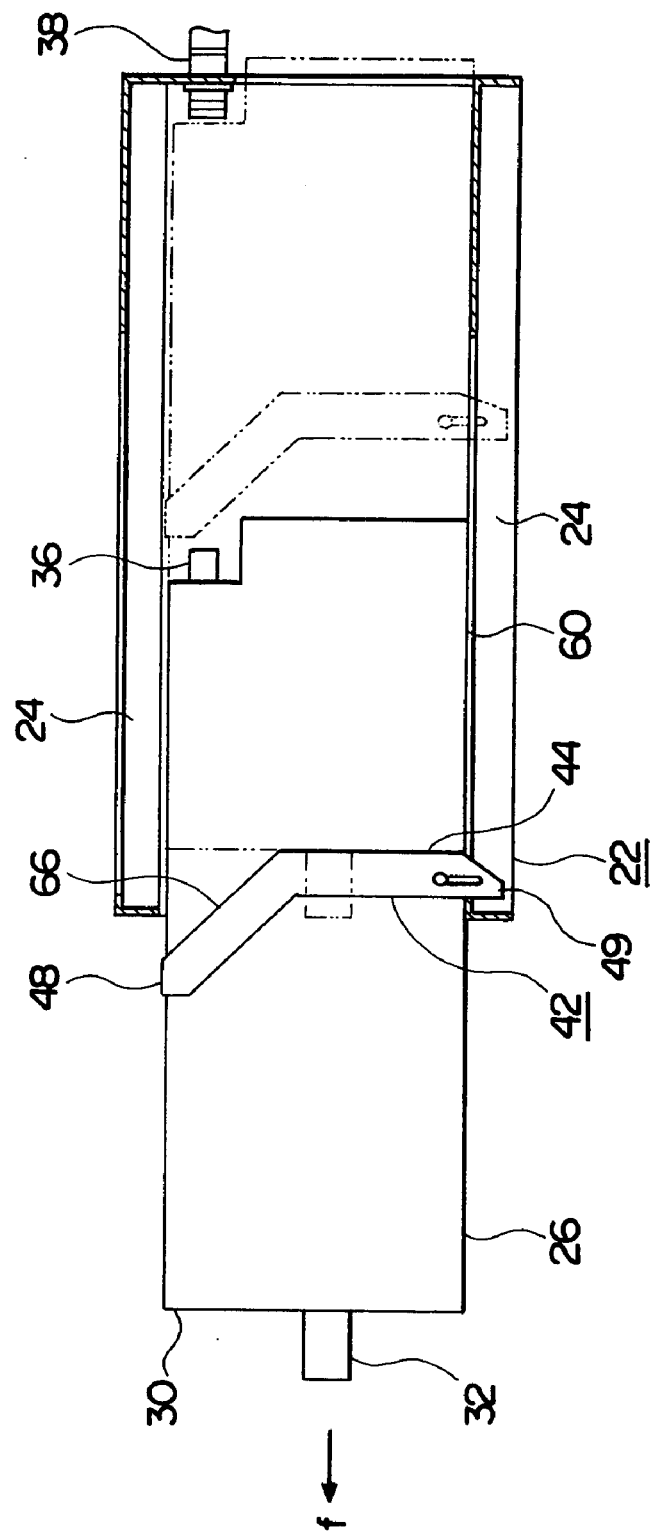
FIG. 11 is a drawing showing a state of a drawing-out limit of a battery unit.

The battery unit 26 mounted in the shelf 22 can be drawn out by grasping its grip part 32. In this case, as shown in FIG. 11, the hooking part 49 of the side arm 44 (46) moves along the lock groove 60 of the shelf rail 24, and, in case in which the battery unit 26 is drawn out by a predetermined length from the shelf 22, the grip part 48 of the lock arm part 42 is exposed from the shelf 22. The battery unit 26 can be moved up to a range that a front edge of the side arm 44 (46) hits on a front edge portion of the lock groove 60. Even if an excessive drawing-out force is applied to the grip part 32, the hooking part 49 hits on the front edge of the lock groove 60, and thereby, movement beyond this is obstructed. Because of this, it is prevented that the battery unit 26 which is a heavy unit is excessively drawn out from the shelf 22. Even if an operator tries to carelessly draw out it, high safety can be secured by maintenance of the locking state.

Figure 12:
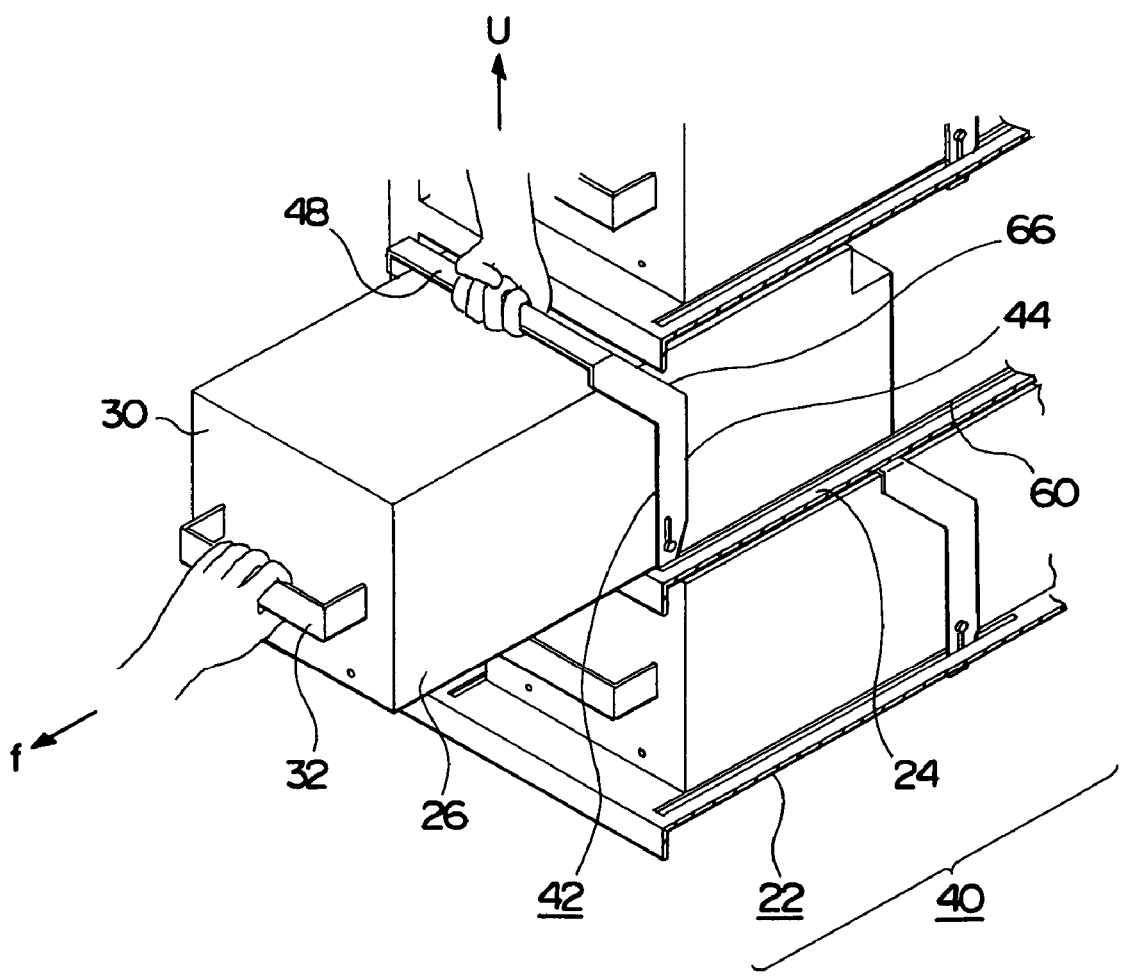
FIG. 12 is a perspective view showing an exchange operation of a battery unit.

Further, since the side arm 44 (46) is a bent shape, the grip part 48 is exposed from the shelf 22 under a state inserted into the lock groove 60. Because of this, as shown in FIG. 12, an operator can grasp the grip part 48 with ease and can pull up the lock arm part 42 in an upper direction (an arrow U). If the lock arm part 42 is pulled up, as shown in FIG. 13, the side arm 44 (46) is separated from the lock groove 60, and the locking state is released.

For example, if the battery unit 26 is pulled up by grasping the grip part 32 by one hand and by grasping the grip part 48 by the other hand, the battery unit 26 is managed by both hands, and it is possible to drawn out the battery unit 26 from the shelf 22 with ease. There is no danger of a fall and so on in the battery unit 26 which is operated by both hands, and an operation with high safety becomes possible.

Figure 14:
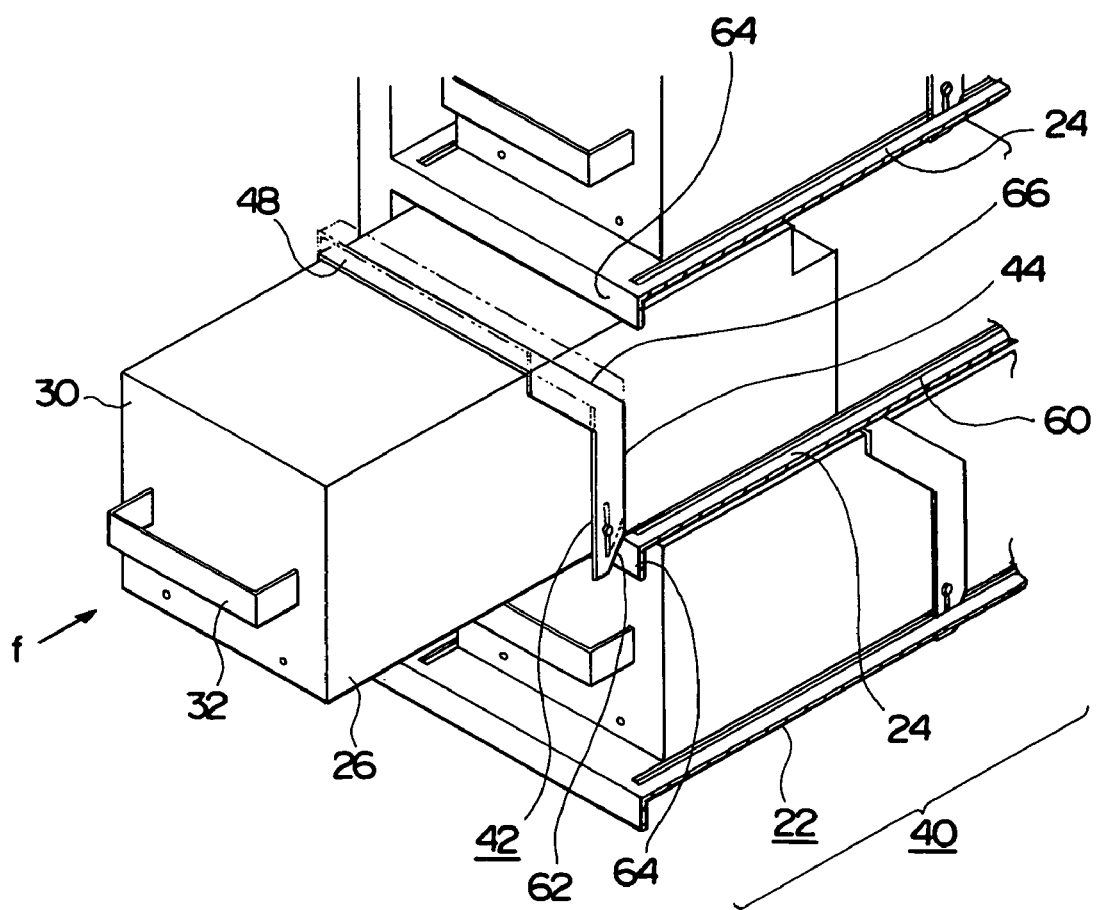
FIG. 14 is a perspective view showing an exchange operation of a battery unit.

Furthermore, in case in which the battery unit 26 which is exchanged is attached to the shelf 22, as shown in FIG. 12, the battery unit 26 is put on the shelf rail 24 of the shelf 22 by grasping the grip parts 32 and 38. Then, as shown in FIG. 14, if the battery unit 26 is slid by applying a force f in a direction shown by an arrow to the battery unit 26, the taper part 62 of the side arm 44 (46) hits the shelf rail 24 on the front edge portion 64. Under this state, if the battery unit 26 is further pushed into the shelf 22 by applying the force f from the grip part 32, the taper part 62 slides up on the front edge portion 64 of the shelf rail 24. By this, the side arm 44 (46) is pulled up, and the side arm 44 (46) shifts on the shelf rail 24. If the battery unit 26 is further pushed into the shelf 22, the side arm 44 (46) falls into the lock groove 60 of the shelf rail 24, and a locking state by means of the locking mechanism 40 is established between the shelf rail 24 and the battery unit 26.

In this case, as described before, even if a state that the lock arm part 42 is pulled up is maintained, by receiving a force f applied to the battery unit 26, the same force f is given to the taper part 66 of the side arm 44 (46) from the front edge portion 64 (U) of the shelf rail 24 (U) of the upper side. Because of this, the lock arm part 42 is pulled down by compulsion, and the lock arm part 42 can be housed in the shelf 22 by compulsion.

As described above, according to the mounting/demounting construction of an apparatus unit constituted like this, an exchange operation of a heavy unit of the battery unit 26 and so on becomes easy, and it is also possible to protect an operator from danger of a fall and so on. In particular, concerning the exchange of a heavy unit, since an operator is compelled to operate by both hands, and besides, since the operator can manage the battery unit 26 by the grip parts 32 and 48 of two places, an excessive load is not given to one hand, either. The operator is released from an experiential operation that the operator lends the other hand to the battery unit 26, and it is possible to contribute to the improvement of safety. Furthermore, since the degree of fatigue of an operator can be reduced, it is possible to contribute to also the improvement of efficiency of an exchange operation.

In connection with the embodiment described above, modified examples of this are enumerated in the following.

(1) In the above-mentioned embodiment, the grip part 48 is formed in a plate shape. However, for example, a curved part 70 can be formed at an intermediate portion of the grip part 48 as shown in FIG. 15. According to this, a space part 72 into which a finger and so on of an operator can be inserted is formed between the upper face part of the battery unit 26 and the grip part 48. Because of this, an operation of the lock arm part 42 becomes easy, and a sure grasp also becomes possible.

Figure 16:
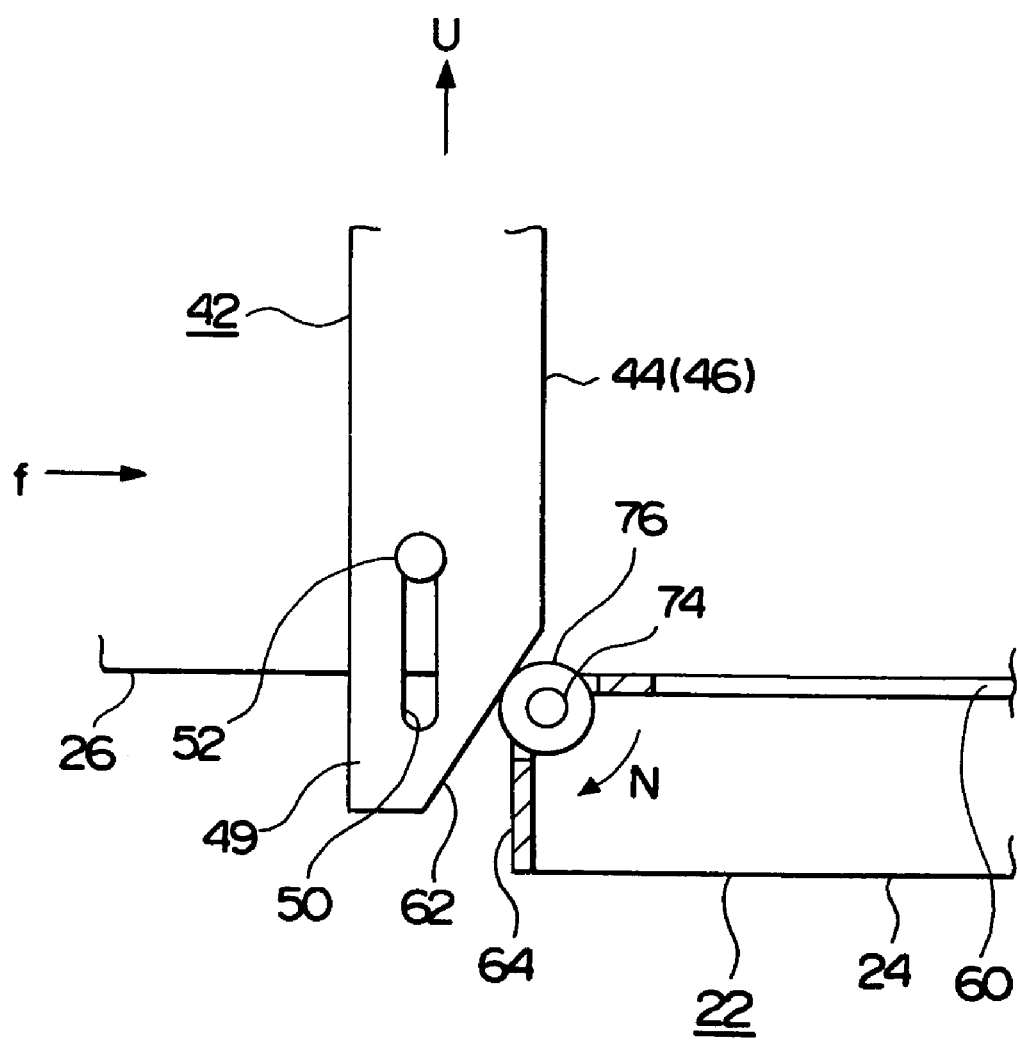
FIG. 16 is a side view showing a modified example of a pulling-up mechanism of a lock arm part.

(2) The above-mentioned embodiment is constituted so that the lock arm part 42 can be pulled up by the taper part 62 sliding up through friction between the taper part 62 of the side arm 44 (46) and the front edge portion 64 of the shelf rail 24. However, the present invention is not limited to this. For example, as shown in FIG. 16, the present invention may also be constituted so that a roller 76 which is rotatably supported by a shaft 74 is attached to the front edge portion 64 of the shelf rail 24, and so that the side arm 44 (46) is pulled up through the roller 76. An arrow N shows a rotation of the roller 76 due to movement of the taper part 62. By the rotation of the roller 76, the side arm 44 (46) is to be easily and rapidly pulled up.

(3) In the above-mentioned embodiment, the battery unit 26 is illustrated as an example of an apparatus unit. However, as for an apparatus unit, the present invention can be applied to many kinds of units of a case unit which houses a function part, a storage part and so on of an electronic apparatus, a power source unit and so on in addition to the battery unit 26, and there is not always necessity of a heavy unit. The present invention can also apply to a large-sized unit which is troublesome in management.

(4) The disk array apparatus is illustrated as an electronic apparatus. However, the present invention can also apply to an information processing apparatus and so on in addition to the disk array apparatus, and is not limited to an apparatus in the embodiment.

(5) In the above-mentioned embodiment, the explanation is given in relation to a composition that performs a lock and a lock release by means of the operation in the orthogonal direction, which makes into a locking state by making the lock arm part 42 of the locking mechanism 40 go down and makes into a lock-releasing state by making it go up. However, it is enough if a composition which performs a lock release by means of an operation different from the operation drawing out an apparatus unit by the grip part 32 is given. For example, the present invention may also be constituted so that the grip part 48 is provided in a direction crossing with a drawing-out direction of the grip part 32, and so that an apparatus unit is drawn out in a horizontal direction and is mounted/demounted.

Although the best mode for carrying out the invention, the object, the configuration and the operation and effect have been described in detail above, the invention is not limited to such embodiment for carrying out the invention, and it is a matter of course that the invention can be variously changed or modified by a person skilled in the art on the basis of a gist and split of the invention as disclosed in claims and the detailed description of the invention, and such a change or modification, and various conjectured configurations, modified examples and so forth are included in the scope of the invention, and the description of the specification and drawings are not restrictively understood.

The entire disclosure of Japanese Patent Application No. 2004-131501 including specification, claims, drawings and summary are incorporated herein by reference in its entirety.

What is claimed is:

1. A mounting/demounting construction of an apparatus unit, comprising:
    a mountable/demountable apparatus unit, having a grip part, that is slidably supported in a shelf; and
    a locking mechanism, on the apparatus unit including a lock arm part engaging with said shelf wherein when engaged, the mechanism regulates said apparatus unit in a predetermined drawing-out range, and prevents a separation of said apparatus unit from said shelf,
    wherein a slidable range of said apparatus unit is regulated in the drawing-out range while the lock arm part is engaged with said shelf, and said apparatus unit can be separated from said shelf by sliding the apparatus unit using the grip part and by raising said lock arm part so that said lock arm part is released from engagement with said shelf.

2. The mounting/demounting construction of an apparatus unit of claim 1, wherein said lock arm part is hidden in said shelf by said apparatus unit being housed.

3. The mounting/demounting construction of an apparatus unit of claim 1, wherein said lock arm part is exposed from said shelf by drawing-out of a predetermined quantity of said apparatus unit from said shelf, and can be released from engagement with said shelf.

4. The mounting/demounting construction of an apparatus unit of claim 1, wherein said lock arm part has a grip part that is exposed from said shelf in case in which said apparatus unit is drawn out from said shelf.

5. The mounting/demounting construction of an apparatus unit of claim 1, wherein a lock groove is provided to a shelf part of said shelf, a hooking part inserted into said lock groove is provided to said lock arm part, and drawing-out of said apparatus unit is restricted to a range of said lock groove by engagement between said lock groove and said hooking part.

6. The mounting/demounting construction of an apparatus unit of claim 1, wherein a first taper part is provided to said lock arm part, and said lock arm part receives a force applied to said apparatus unit through contact between said first taper part and a shelf part of said shelf and is pulled up.

7. The mounting/demounting construction of an apparatus unit of claim 1, wherein a second taper part is provided to said lock arm part, and said lock arm part receives a force applied to said apparatus unit through contact between said second taper part and a shelf part of said shelf and is pulled down.

8. The mounting/demounting construction of an apparatus unit of claim 1, wherein said apparatus unit is a case unit of an electronic apparatus, a power supply unit or a battery unit.

9. An electronic apparatus, comprising:
    a mountable/demountable apparatus unit, having a grip part, that is slidably supported in a shelf; and
    a locking mechanism, on the apparatus unit including a lock arm part engaging with said shelf wherein when engaged, the mechanism regulates said apparatus unit in a predetermined drawing-out range, and prevents a separation of said apparatus unit from said shelf,
    wherein a slidable range of said apparatus unit is regulated in the drawing-out range while the lock arm part is engaged with said shelf, and said apparatus unit can be separated from said shelf by sliding the apparatus unit using the grip part and by raising said lock arm part so that said lock arm part is released from engagement with said shelf.

10. The electronic apparatus of claim 9, wherein said lock arm part is hidden in said shelf by said apparatus unit being housed.

11. The electronic apparatus of claim 9, wherein said lock arm part is exposed from said shelf by drawing-out of a predetermined quantity of said apparatus unit from said shelf, and can be released from engagement with said shelf.

12. The electronic apparatus of claim 9, wherein said lock arm part has a grip part that is exposed from said shelf in case in which said apparatus unit is drawn out from said shelf.

13. The electronic apparatus of claim 9, wherein a lock groove is provided to a shelf part of said shelf, a hooking part inserted into said lock groove is provided to said lock arm part, and drawing-out of said apparatus unit is restricted to a range of said lock groove by engagement between said lock groove and said hooking part.

14. The electronic apparatus of claim 9, wherein a first taper part is provided to said lock arm part, and said lock arm part receives a force applied to said apparatus unit through contact between said first taper part and a shelf part of said shelf and is pulled up.

15. The electronic apparatus of claim 9, wherein a second taper part is provided to said lock arm part, and said lock arm part receives a force applied to said apparatus unit through contact between said second taper part and a shelf part of said shelf and is pulled down.

* * * * *